J. MESSNER.
TRACTION SHOE.
APPLICATION FILED DEC. 18, 1920.
1,395,134. Patented Oct. 25, 1921.
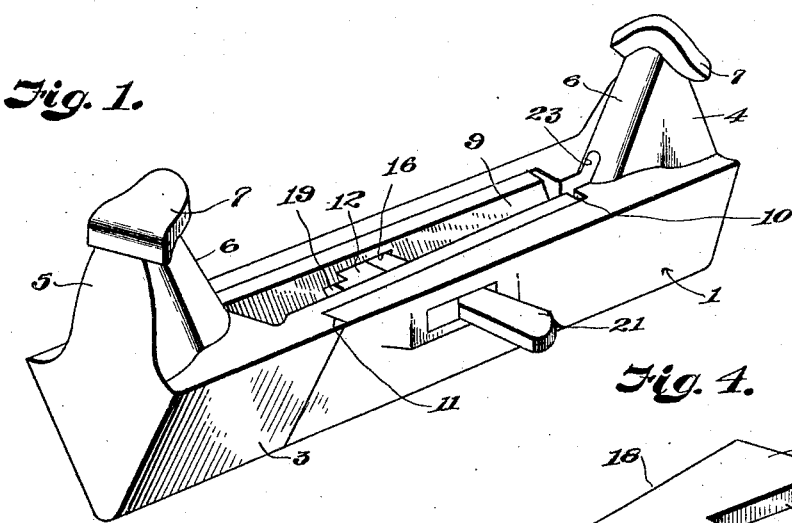
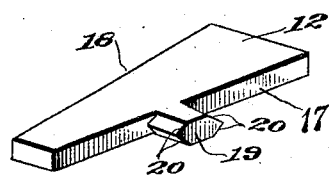
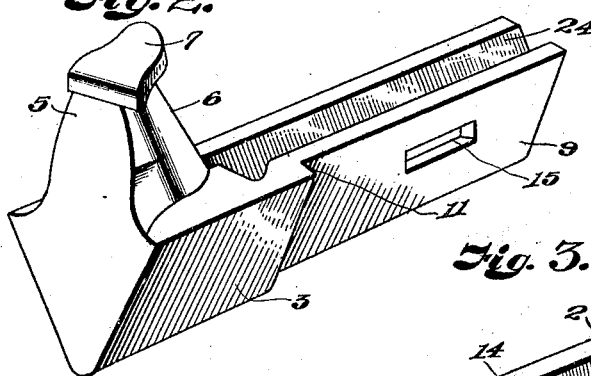
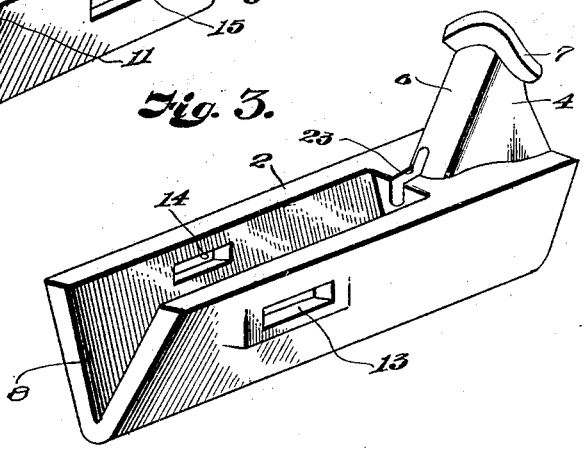
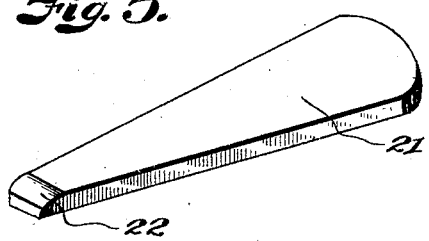
JOHN MESSNER.
INVENTOR
BY Victor J. Evans.
ATTORNEY

UNITED STATES PATENT OFFICE.

JOHN MESSNER, OF CALUMET, MICHIGAN.

TRACTION-SHOE.

1,395,134.     Specification of Letters Patent.     Patented Oct. 25, 1921.

Application filed December 18, 1920. Serial No. 431,639.

*To all whom it may concern:*

Be it known that I, JOHN MESSNER, a citizen of the United States, residing at Calumet, in the county of Houghton and State of Michigan, have invented new and useful Improvements in Traction-Shoes, of which the following is a specification.

This invention relates to traction shoes and an object of the invention is to provide a traction shoe for tractors which is detachable, to permit its removal from either traction wheels or traction chains of a caterpillar tread tractor, when necessary.

An object of this invention is to provide a traction shoe which is particularly designed for effective gripping engagement with the chains of a caterpillar tractor, so as to prevent accidental movement of the shoe relative to the chains and yet permit removal of a tread when necessary or desirable.

Other objects of the invention will appear in the following description taken in connection with the accompanying drawing wherein:

Figure 1 is a perspective view of the improved traction shoe assembled.

Fig. 2 is a perspective view of the inserting section of the traction shoe.

Fig. 3 is a perspective view of the receiving section of the traction shoe.

Fig. 4 is a perspective view of the locking key of the traction shoe.

Fig. 5 is a perspective view of the locking wedge of the traction shoe.

Referring more particularly to the drawing, the improved traction shoe 1 comprises the main body sections 2 and 3, each of which are substantially pyramidal in shape and have upstanding gripping extensions 4 and 5 formed integrally thereon at their ends. The inner edges of the upstanding projections 4 and 5 are rounded, as clearly shown at 6, and incline outwardly and upwardly from the upper surface of the body sections 2 and 3 for properly fitting and gripping the links of the traction chain of a caterpillar tractor. Binding plates 7 are formed upon the upper ends of the upstanding gripping extensions 4 and 5 and incline upwardly from the ends of the body sections, as clearly shown in the drawings. The body section 2 is recessed for the major portion of its length providing a substantially pyramidal shaped recess 8 which telescopically receives the reduced portion 9 of the body section 3. The reduced portion 9 of the body section 3 is slightly shorter than the recess 8 as shown at 10 in Fig. 1 of the drawings and the body section 3 is provided with shoulders 11 at the outer terminal of its reduced portion against which shoulders the open end of the body section 2 abuts. The reduced portion 9 fits snugly within the recess 8 and the locking key 12 is inserted through transversely extending alined openings 13 and 14 formed in the sides of the body section 2 and openings 15 and 16 formed in the sides of the reduced portion 9 of the body section 3. The locking key 12 is provided with one straight edge 17 and an angle edge 18 and it also has a lateral extending lug 19 projecting outwardly from its straight edge 17. The edges of the lug 19 are beveled as shown at 20 so as to fit snugly against the inner angled sides of the reduced portion 9 of the body section 3. The locking key 12 is securely wedged in the alined openings 13, 14, 15 and 16 with the lug 19 in firm engagement with the inner sides of the reduced portion 9, by a locking wedge 21 having tapered edges and having its end reduced in thickness as shown at 22 to facilitate its insertion in the alined openings 13, 14, 15, and 16, for securely wedging the locking key 12 in place and preventing accidental relative movement of the body sections 2 and 3. The body sections 2 and 3 are provided with cutout portions or recesses 23 formed therein at the ends of the recesses 8 and 24 which extend longitudinally of the body sections throughout their major portions. The openings 23 are relatively small and are provided for receiving therein portions of the chains of the caterpillar tractor when the shoe is used upon certain types of traction chains.

By cutting relatively small recesses in the edges of the rims of the traction wheel the improved traction shoe may be mounted at circumferentially spaced positions about a wheel rim for providing removal cleats or grouters therefor to increase the tractive proclivities of the wheels.

From the foregoing description taken in connection with the accompanying drawing it will be apparent that a traction shoe has been provided which is strong and durable, and one which may easily and quickly be applied to either a traction chain of a caterpillar tractor or to the traction wheel of the tractor and also one, which, owing to its substantial pyramidal shape presents substantially a sharpened edge for engagement with the surface over which the tractor is moving, and will provide firm and secure tractive engagement with a road surface.

It is, of course, to be understood that the invention may be constructed in various other manners and the parts associated in different relations and, therefore, I do not desire to be limited in any manner except as set forth in the claims hereunto appended.

Having thus described my invention what I claim is:

1. As a new article of manufacture a traction shoe comprising a pair of sections substantially pyramidal in shape, gripping extensions formed upon the ends of said body sections, and means for detachably connecting the body sections.

2. As a new article of manufacture, a traction shoe comprising a pair of body sections, gripping extensions formed upon said body sections and projecting outwardly from one surface thereof, said body sections comprising telescoping portions, and wedge means for locking said sections against accidental disconnection.

3. As a new article of manufacture a traction shoe comprising a pair of substantially pyramidal body sections, gripping extensions formed upon said body sections at one of their ends and projecting outwardly from one surface thereof, binding plates formed upon the outer ends of said gripping extensions and extending transversely thereto, and means for detachably connecting said sections.

4. As a new article of manufacture a traction shoe comprising a pair of substantially pyramidal body sections, gripping extensions formed upon said body sections at one of their ends and projecting outwardly from one surface thereof, binding plates formed upon the outer ends of said gripping extensions and extending transversely thereto, said body sections provided with telescoping portions, said telescoping portions provided with alining openings, and wedge means extending through said opening for detachably connecting said body sections.

5. As a new article of manufacture a traction shoe comprising a pair of substantially pyramidal body sections, gripping extensions formed upon said body sections at one of their ends and projecting outwardly from one surface thereof, binding plates formed upon the outer ends of said gripping extensions and extending transversely thereto, said body sections provided with telescoping portions, said telescoping portions provided with alining openings, a locking key adapted for extending through said alining openings, a transverse lug formed upon said locking key for engagement with the innermost of said telescoping portions.

6. As a new article of manufacture, a traction shoe comprising a pair of substantially pyramidal body sections, gripping extensions formed upon said body sections at one of their ends and projecting outwardly from one surface thereof, binding plates formed upon the outer ends of said gripping extensions and extending transversely thereto, said body sections provided with telescoping portions, said telescoping portions provided with alining openings, a locking key adapted for extending through said alining openings, a transverse lug formed upon said locking key for engagement with the innermost of said telescoping portions, and a locking wedge for driving through said alining openings and wedge engagement with said locking key to securely wedge the locking key in place.

In testimony whereof I affix my signature.

JOHN MESSNER.